US011932258B2

(12) United States Patent
Nishihashi et al.

(10) Patent No.: US 11,932,258 B2
(45) Date of Patent: Mar. 19, 2024

(54) VEHICLE SPEED ESTIMATION METHOD AND VEHICLE SPEED ESTIMATION DEVICE FOR FOUR-WHEEL DRIVE VEHICLE

(71) Applicant: Nissan Motor Co., Ltd., Yokohama (JP)

(72) Inventors: Naoshi Nishihashi, Kanagawa (JP); Yuki Nakajima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 379 days.

(21) Appl. No.: 17/414,391

(22) PCT Filed: Dec. 18, 2018

(86) PCT No.: PCT/JP2018/046634
§ 371 (c)(1),
(2) Date: Jun. 16, 2021

(87) PCT Pub. No.: WO2020/129163
PCT Pub. Date: Jun. 25, 2020

(65) Prior Publication Data
US 2022/0041170 A1 Feb. 10, 2022

(51) Int. Cl.
*B60W 40/105* (2012.01)
*B60W 10/08* (2006.01)
*B60W 30/02* (2012.01)

(52) U.S. Cl.
CPC .......... *B60W 40/105* (2013.01); *B60W 10/08* (2013.01); *B60W 30/02* (2013.01);
(Continued)

(58) Field of Classification Search
CPC .... B60W 40/105; B60W 10/08; B60W 30/02; B60W 2510/083; B60W 2520/28;
(Continued)

(56) References Cited

U.S. PATENT DOCUMENTS

2018/0173224 A1* 6/2018 Kim ............... G05D 1/0061

FOREIGN PATENT DOCUMENTS

JP 7-47948 A 2/1995
JP 11-78845 A 3/1999
(Continued)

OTHER PUBLICATIONS

Chinese Office Action of Oct. 27, 2023 of corresponding Chinese Patent Application No. 201880100269.3.

*Primary Examiner* — Tyler D Paige
(74) *Attorney, Agent, or Firm* — Global IP Counselors, LLP

(57) ABSTRACT

A vehicle body speed estimation device and a vehicle body speed estimation method are provided for estimating a vehicle body speed of a four-wheel drive vehicle from a wheel speed of each wheel of the four-wheel drive vehicle. In the vehicle body speed estimation device and a vehicle body speed estimation method, a controller determines whether a deviation of at least two of the wheel speeds among the wheel speeds is within a first prescribed range. The controller switches a method for selecting the wheel speed used for estimating the vehicle body speed between a first method and a second method when a sign of a drive torque that is applied to each of the wheels is reversed and the deviation of at least two of the wheel speeds among the wheel speeds is within the first prescribed range.

11 Claims, 5 Drawing Sheets

(52) U.S. Cl.
CPC ... *B60W 2510/083* (2013.01); *B60W 2520/28* (2013.01); *B60W 2720/26* (2013.01)

(58) Field of Classification Search
CPC ......... B60W 2720/26; B60W 2300/18; B60W 2520/30; B60W 2720/30; B60T 2220/04; B60T 1/10; B60T 7/042; B60T 8/26; B60T 8/3215; B60T 8/3255; B60T 13/586; B60T 2250/042; B60T 8/3205; B60T 8/58; B60T 8/322; F16D 61/00
USPC ......................................................... 701/70
See application file for complete search history.

(56) References Cited

FOREIGN PATENT DOCUMENTS

| | | |
|---|---|---|
| JP | 3772486 | 5/2006 |
| JP | 2009-61904 A | 3/2009 |
| JP | 2016-94139 A | 5/2016 |
| JP | 2016-137893 A | 8/2016 |
| WO | 2009/031017 A2 | 3/2009 |

* cited by examiner

VEHICLE SPEED ESTIMATION METHOD AND VEHICLE SPEED ESTIMATION DEVICE FOR FOUR-WHEEL DRIVE VEHICLE

CROSS-REFERENCE TO RELATED APPLICATIONS

This application is a U.S. national stage application of International Application No. PCT/JP2018/046634, filed on Dec. 18, 2018.

BACKGROUND

Technical Field

The present invention relates to a vehicle body speed estimation method and a vehicle body speed estimation device for four-wheel drive vehicles.

Background Information

Japanese Patent No. 3772486 (Patent Document 1) discloses a technology wherein, when there is a so-called increase in the estimated vehicle body speed of a vehicle, that is, when an estimated vehicle body speed that exceeds the actual vehicle body speed is calculated, the wheel cylinder pressure of one wheel is reduced to decrease the slip ratio of the wheel, the estimated error is calculated in accordance with the time until the slippage settles, and the estimated vehicle body speed is corrected.

SUMMARY

In a four-wheel drive vehicle, when transitioning from a traction control for suppressing driving slip of wheels to an anti-skid control for suppressing the braking slip of wheels, if the method for selecting the wheel speed used for estimating the vehicle body speed is switched from select-low to select-high at the same time as the switch between the two controls, the estimation accuracy of the vehicle body speed decreases due to the influence of the overshoot of the wheel speed. The prior art described above does not present any solutions to this problem. An object of the present invention is to provide a vehicle body speed estimation method and a vehicle body speed estimation device for four-wheel drive vehicles that can suppress a reduction in the accuracy of the estimated vehicle body speed.

In the present invention, if the sign of the drive torque that is applied to each wheel is reversed, when the deviation of at least two of the wheel speeds comes within a first prescribed range, the method for selecting the wheel speed used for estimating the vehicle body speed is switched between a first method and a second method.

Thus, by means of the present invention, it is possible to suppress a decrease in the estimation accuracy of the vehicle body speed.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings for estimating a vehicle body speed of a four-wheel drive vehicle.

First Embodiment

Figure 1:
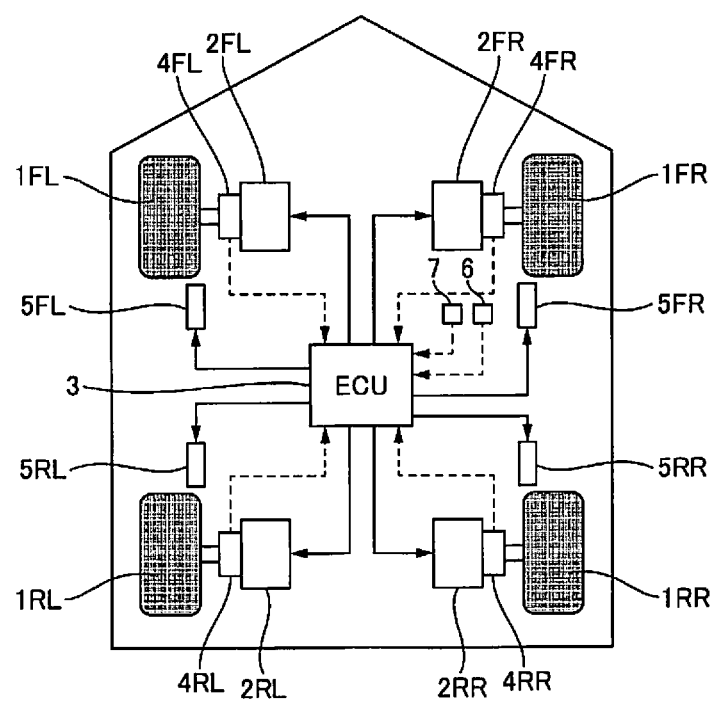
FIG. 1 is a system configuration view of a four-wheel drive vehicle of a first embodiment.

FIG. 1 is a system configuration diagram of a four-wheel drive vehicle of the first embodiment. The four-wheel drive vehicle (hereinafter referred to as the vehicle) is an all-wheel drive vehicle that can independently control the driving force of wheels 1 (a front left wheel 1FL, a front right wheel 1FR, a rear left wheel 1RL and a rear right wheel 1RR). Hereinbelow, when a distinction is to be made between members corresponding to each of the wheels 1FL-1RR, the letters FL-RR will be appended to the end of each reference numeral, whereas when no distinction is to be made, the letters FL-RR will be omitted.

The vehicle of the first embodiment has an electric motor 2 as a driving force generation source. An output shaft of the electric motor 2 is connected to the wheels 1. The electric motor 2 is, for example, a three-phase synchronous motor in which a permanent magnet is embedded in a rotor. The power running and regenerative torque of the electric motor 2 are controlled by means of a torque command output from a controller (ECU) 3 to an inverter. The inverter supplies electric power to the electric motor 2 in accordance with the torque command.

The wheels 1 are provided with wheel speed sensors 4 and brake units 5. The wheel speed sensors 4 detect the rotational speed (wheel speed) of the corresponding wheels and output the detection signal to the ECU 3. The brake units 5 are disk-type units, for example, having hydraulic brake calipers. The frictional braking force that the brake units 5 apply to the wheels 1 is controlled by means of a braking command output from the ECU 3 to a hydraulic pressure control unit. The hydraulic pressure control unit supplies a brake fluid pressure command to the brake calipers of the brake units 5 in accordance with the braking command.

In addition to detection signals of the wheel speed sensor 4, an accelerator opening degree sensor 6, and a brake pedal stroke sensor 7, the state of a battery that supplies electric power to the electric motor 2, and other travel states (vehicle speed, yaw rate, lateral G, steering angle of a steering wheel, turning angle of the front wheels 1FL, 1FR, etc.) are input to the ECU 3. The accelerator opening degree sensor 6 detects the amount of depression of the accelerator pedal (accelerator opening degree) depressed by a driver. The brake pedal stroke sensor 7 detects the amount of depression of the brake pedal (brake stroke) depressed by the driver.

At the time of the driver's accelerator depression operation, the ECU 3 calculates a target acceleration of the vehicle in accordance with the accelerator opening degree and the vehicle speed, and generates a torque command for obtaining the target acceleration. In addition, at the time of the driver's brake depression operation, the ECU 3 calculates a target deceleration of the vehicle in accordance with the brake pedal stroke and the vehicle speed, and generates a torque command and a braking command for obtaining the target deceleration. In order to recover energy and increase energy efficiency, the target deceleration should be achieved only by means of regenerative braking as much as possible, and the torque command and the braking command are calculated so as to compensate for the braking force that is lacking by means of regenerative braking with frictional braking.

The vehicle of the first embodiment has a traction control system (hereinafter referred to as TCS) that reduces the power running torque of the electric motor 2, when the torque of the electric motor 2 suddenly increases due to a sudden accelerator depression operation and the wheels 1 tend to display driving slip (wheel spin), so as to suppress this driving slip. At the time of driving slip of the wheels 1, when the wheel slip ratio deviates greatly from a prescribed slip ratio (normally, an ideal slip ratio at which the road surface friction coefficient becomes maximum and it becomes possible to maximize the driving force) at the time of the sudden acceleration described above, the TCS reduces the output torque of the electric motor 2 and causes the wheel slip ratio to converge to the prescribed slip ratio by means of reduction of the wheel speed. The ideal slip ratio is the estimated vehicle body speed+α1, and the prescribed slip ratio shall be the ideal slip ratio+α2. In the TCS, for example, the average value of each wheel speed of the front wheels 1FL, 1FR is compared with the average value of each wheel speed of the rear wheels 1RL, 1RR, and the smaller value is selected by means of select-low as the estimated vehicle body speed (first method).

In addition, the vehicle of the first embodiment has an anti-skid braking system (hereinafter referred to as ABS) that reduces the regenerative torque of the electric motor 2, when the wheels 1 tend to display braking slip (lock) during deceleration as a result of a sudden braking operation, so as to suppress this braking slip. At the time of braking slip of the wheels 1, when the wheel slip ratio deviates greatly from a prescribed slip ratio (normally, an ideal slip ratio at which the road surface friction coefficient becomes maximum and it becomes possible to minimize the braking distance) at the time of the sudden deceleration described above, the ABS reduces the regenerative torque of the electric motor 2 and causes the wheel slip ratio to converge to the prescribed slip ratio by means of recovery of the wheel speed. The ideal slip ratio is the estimated vehicle body speed+α3, and the prescribed slip ratio shall be the ideal slip ratio+α4. In the ABS, for example, the average value of each wheel speed of the front wheels 1FL, 1FR is compared with the average value of each wheel speed of the rear wheels 1RL, 1RR, and the larger value is selected by means of select-high as the estimated vehicle body speed (second method).

Additionally, the vehicle of the first embodiment has an active stability control system (hereinafter referred to as ASC) that utilizes the ABS described above and applies regenerative torque to one or more electric motors 2, so as to prevent the vehicle from skidding outwardly or spinning, particularly at the time of cornering. When the yaw rate of the vehicle deviates greatly from a target yaw rate and a disturbance occurs in the attitude of the vehicle, the ASC increases the regenerative torque of one or more electric motors 2 to generate a moment that suppresses the disturbance in the attitude of the vehicle. The target yaw rate is calculated from, for example, the steering angle (or turning angle) and the estimated vehicle body speed, using a known vehicle model. The estimated vehicle body speed of the ASC is determined by means of the same method as for the ABS. Hereinbelow, ABS and ASC are collectively referred to as ASC.

The ECU 3 executes TCS when the sign of the drive torque (motor torque) applied to the wheels 1 is positive and executes ASC (ABS) when the sign of the drive torque is negative. For this reason, when the sign of the drive torque is reversed, the TCS and the ASC are switched. In the first embodiment, with the aim of suppressing a reduction in the estimation accuracy of the vehicle body speed when switching between TCS and ASC, the methods for selecting the wheel speed used for estimating the vehicle body speed, that is, the wheel speed selection method by means of select-low and the wheel speed selection method by means of select-high, are switched in accordance with the speed difference between the left and right front and rear wheels.

Figure 2:
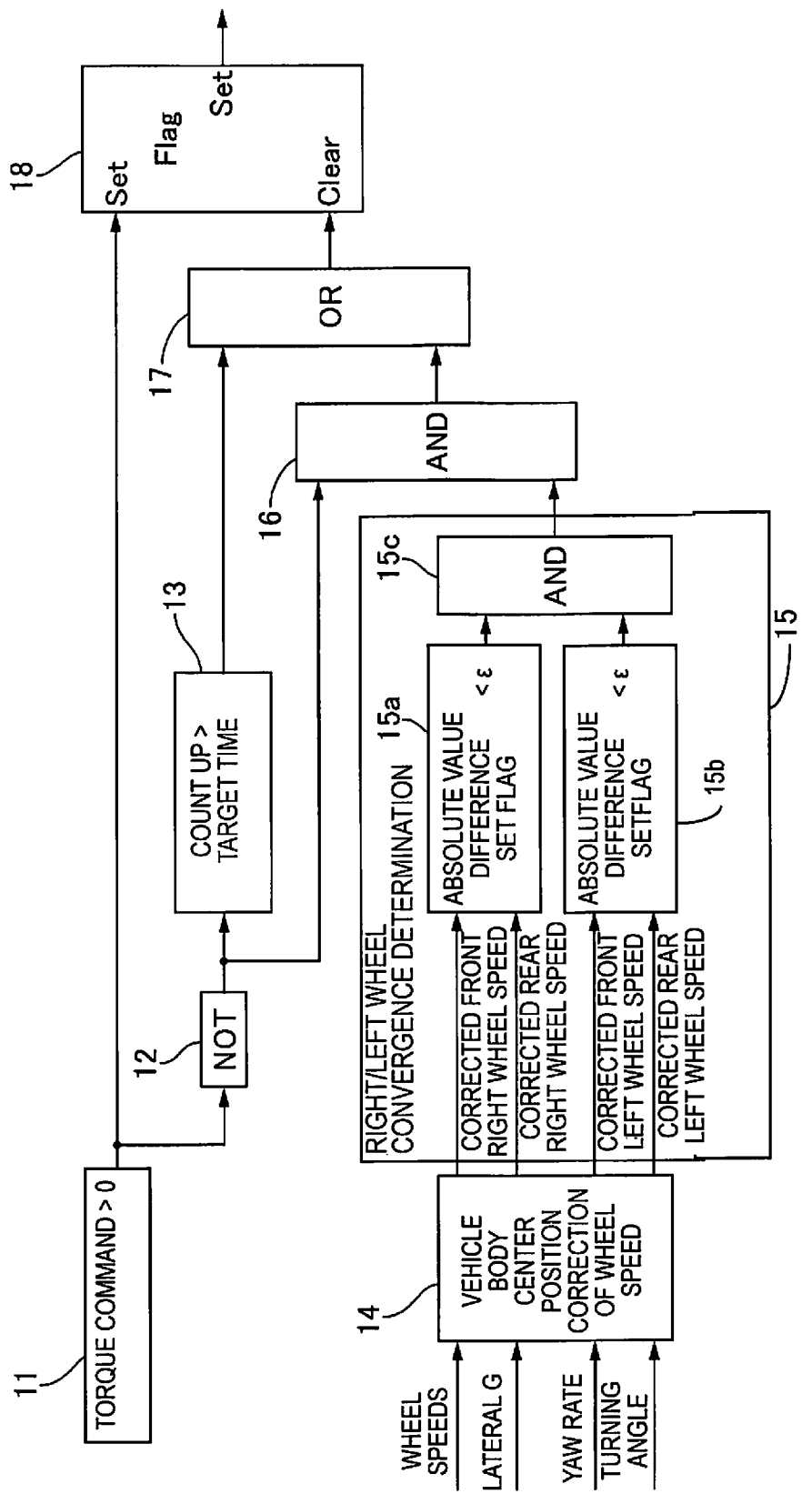
FIG. 2 is a block diagram of a control for switching a wheel speed selection method in an ECU 3 of the first embodiment.

FIG. 2 is a block diagram of a control for switching wheel speed selection method in the ECU 3. The comparison circuit 11 outputs 1 when the sign of the torque command is positive, and outputs 0 when the sign is 0 or negative. The NOT circuit 12 outputs 1 when the output of the comparison circuit 11 is 0, and outputs 0 when the output is 1. The comparison circuit 13 starts incrementing a counter when the output of the NOT circuit 12 switches from 0 to 1, outputs 0 when the counter is less than or equal to a prescribed time (target time), and outputs 1 when the counter exceeds the prescribed time. The wheel speed correction unit 14 corrects each wheel speed to a wheel speed corresponding to the center position of the vehicle body using the lateral G, the yaw rate, and the turning angle, and outputs a corrected front right wheel speed, a corrected front left wheel speed, a corrected rear right wheel speed, and a corrected rear left wheel speed.

The right/left wheel convergence determination units 15 include a right-side wheel convergence determination unit 15a, a left-side wheel convergence determination unit 15b, and an AND circuit 15c. The right-side wheel convergence determination unit 15a outputs 1 when the absolute value difference (absolute value of the difference) between the corrected front right wheel speed and the corrected rear right wheel speed is smaller than a threshold value ε (when the speed difference becomes within a first prescribed range), and outputs 0 when the absolute value difference is greater than or equal to the threshold value ε. The threshold value ε is set to a value with which it is possible to determine that the corrected front right wheel speed and the corrected rear right wheel speed are converging. The left-side wheel convergence determination unit 15b outputs 1 when the absolute value difference between the corrected front left wheel speed and the corrected rear left wheel speed is smaller than the threshold value ε (when the speed difference becomes within the first prescribed range), and outputs 0 when the absolute value difference is greater than or equal to the threshold value ε. The AND circuit 15c outputs 1 when the outputs of the right-side wheel convergence determination unit 15a and the left-side wheel convergence determination unit 15b are both 1, and outputs 0 otherwise.

An AND circuit 16 outputs 1 when the outputs of the NOT circuit 12 and the right/left wheel convergence determination units 15 are both 1, and outputs 0 otherwise. An OR circuit 17 outputs 1 when the output of at least one of the comparison circuit 13 and the AND circuit 16 is 1, and outputs 0 otherwise. An estimation method switching unit 18 sets a flag (F=1) when the output of the comparison circuit 11 is 1, and clears the flag (F=0) when the output of the OR circuit 17 is 1.

Figure 3:
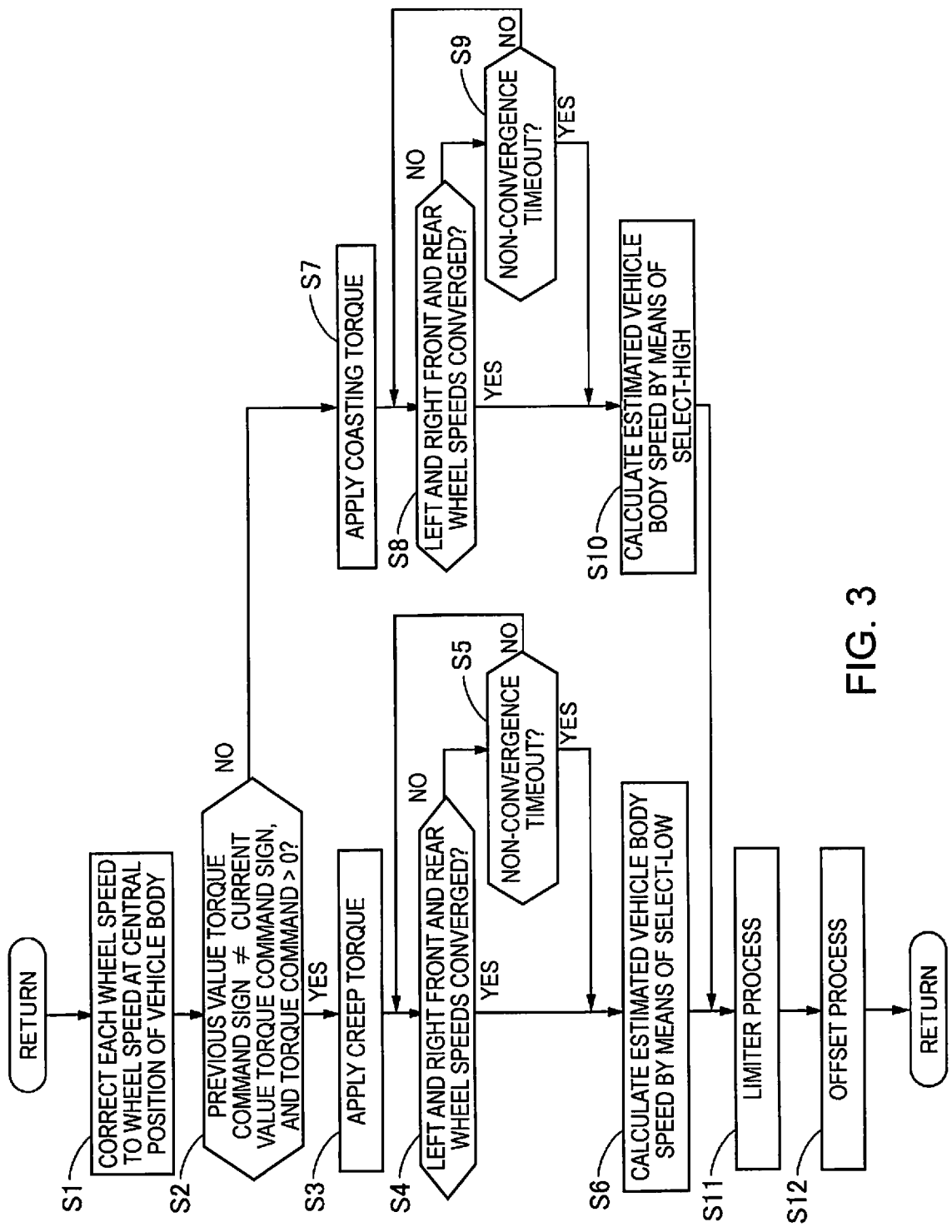
FIG. 3 is a flowchart illustrating a flow of an estimated wheel speed calculation process in the ECU 3 of the first embodiment.

FIG. 3 is a flowchart illustrating the process flow of an estimated wheel speed calculation process in the ECU 3. This process is repeatedly executed in a prescribed control cycle.

In Step S1, each wheel speed is corrected to a wheel speed corresponding to the center position of the vehicle body using the lateral G, the yaw rate, and the turning angle. As a result, it is possible to decrease the threshold value ε for determining convergence of the wheel speeds and to switch the method for selecting the wheel speed at a more appropriate timing.

In Step S2, it is determined whether the sign of the previous torque command and the sign of the current torque command are different from each other, and the sign of the torque command is positive. If YES, the process proceeds to Step S3, and if NO, the process proceeds to Step S7.

In Step S3, the electric motor 2 applies creep torque to the wheels 1. Creep torque is a relatively small positive drive torque with respect to the drive torque corresponding to the torque command. At this time, the amount of creep torque to be applied is weighted in accordance with the lateral G between the inner wheels of the turn and the outer wheels of the turn. Specifically, the weighting for the creep torque to be applied to the inner wheels of the turn is made larger than the weighting for the creep torque to be applied to the outer wheels of the turn as the lateral G becomes larger.

In Step S4, it is determined whether both the left and right front and rear wheel speeds have converged, based on whether the absolute value difference between the corrected front left wheel speed and the corrected rear left wheel speed is smaller than the threshold value ε, and the absolute value difference between the corrected front right wheel speed and the corrected rear right wheel speed is smaller than the threshold value ε. If YES, the process proceeds to Step S6, and if NO, the process proceeds to Step S5.

In Step S5, non-convergence timeout is determined based on whether a prescribed period of time has elapsed since the sign of the torque command switched from positive to negative. When the determination is YES, the process proceeds to Step S6, and if NO, the process returns to Step S4.

In Step S6, the average value of the corrected front left wheel speed and the corrected front right wheel speed is compared with the average value of the corrected rear left wheel speed and the corrected rear right wheel speed, and the smaller value is selected by means of select-low as the estimated vehicle body speed.

In Step S7, the electric motor 2 applies coasting torque to the wheels 1. Coasting torque is a relatively small negative drive torque with respect to the drive torque corresponding to the torque command. At this time, the amount of coasting torque to be applied is weighted in accordance with the lateral G between the inner wheels of the turn and the outer wheels of the turn. Specifically, the weighting for the coasting torque to be applied to the outer wheels of the turn is made larger than the weighting for the coasting torque to be applied to the inner wheels of the turn as the lateral G becomes larger.

In Step S8, it is determined whether both the left and right front and rear wheel speeds have converged, in the same manner as in Step S4. If YES, the process proceeds to Step S10, and if NO, the process proceeds to Step S9.

In Step S9, non-convergence timeout is determined in the same manner as in Step S5. If YES, the process proceeds to Step S10, and if NO, the process returns to Step S8.

In Step S10, the average value of the corrected front left wheel speed and the corrected front right wheel speed is compared with the average value of the corrected rear left wheel speed and the corrected rear right wheel speed, and the larger value is selected by means of select-high as the estimated vehicle body speed.

In Step S11, a logical acceleration is calculated from the empty vehicle weight, road surface gradient, and the state of the current drive torque, and a limiter process is applied to the estimated vehicle body speed determined in Step S6 or Step S10. As a result, it is possible to improve the estimation accuracy of the vehicle body speed when the vehicle is closed to a four-wheel slip-up or a four-wheel skid state.

In Step S12, an offset process is applied to the estimated vehicle body speed after the limiter process. If the estimated vehicle body speed is determined via Step S6, a prescribed value is added to the estimated vehicle body speed, and if the estimated vehicle body speed is determined via Step S10, a prescribed value is subtracted from the estimated vehicle body speed, to thereby determine the final estimated vehicle body speed.

Next, the actions of the first embodiment will be described. In the TCS, the estimated vehicle body speed is calculated by means of select-low of the wheel speeds, and in the ASC (ABS), the estimated vehicle body speed is calculated by means of select-high of the wheel speeds. On the other hand, the switching between the TCS and the ASC is carried out by reversing the sign of the drive torque to be applied to the wheels 1. At this time, if the method for selecting the wheel speed used for estimating the vehicle body speed is switched from select-low to select-high at the same time as switching from the TCS to the ASC, the driving slip of the wheels to be controlled in the TCS will not have converged immediately after the switch, and will overshoot with respect to an appropriate slip amount. For this reason, an estimated vehicle body speed that is higher than the actual vehicle body speed is calculated, being influenced by the overshoot, which generates an erroneous estimation of the vehicle body speed. As a result, the initial regenerative torque is limited by the ASC; therefore, the so-called G drop (ineffective braking) occurs, which leads to a brake-missing feeling.

Conventionally, a technique for correcting increases and decreases in the estimated vehicle body speed is known as a vehicle body speed estimation method. However, since this known technology is premised on a hydraulic braking system, the above-described problem (that the estimation accuracy of the vehicle body speed decreases, being influenced by the overshoot of the wheel speed) cannot be solved. The problem described above is a phenomenon that occurs when continuously executing driving and strong regeneration by means of a motor in a high-response electric four-wheel drive vehicle, and ends in several hundred msec, so that it does not become a problem in a system that requires a shift from depressing the accelerator to depressing the brake in order to generate a large braking force, since there is the time required for the shifting of the foot.

Figure 4:
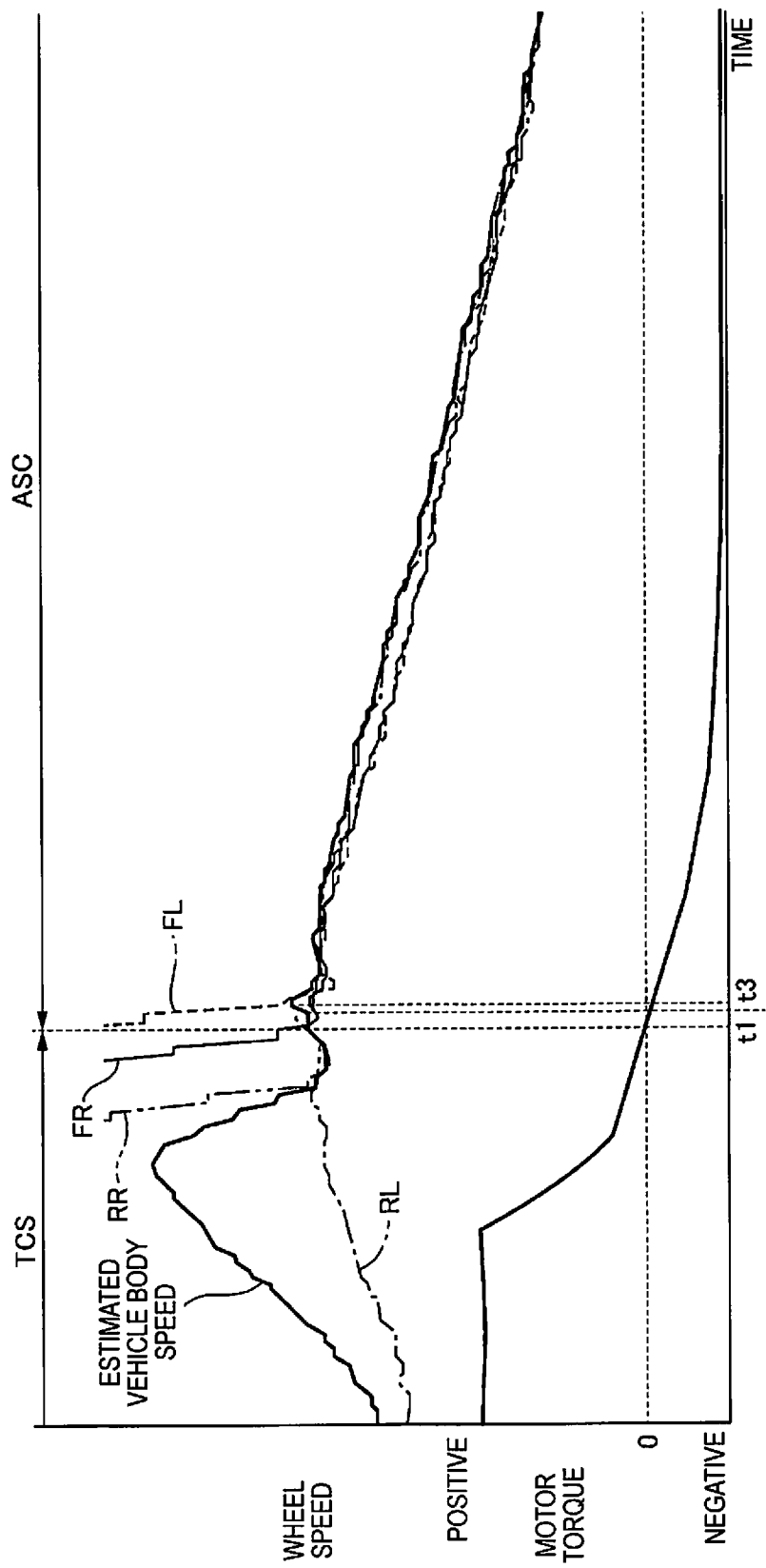
FIG. 4 is a time chart illustrating an action for switching the wheel speed selection method of the first embodiment.
Figure 5:
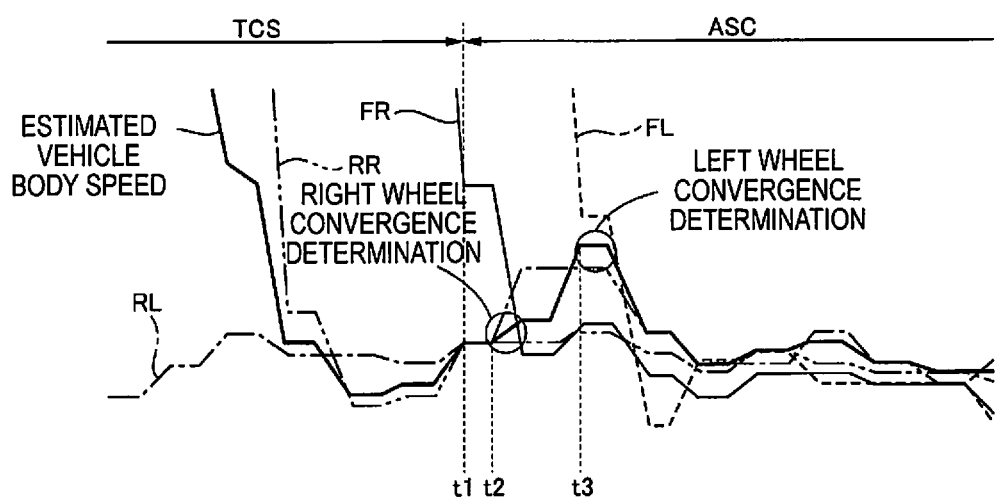
FIG. 5 is an enlarged view of a main part of FIG. 4.

In contrast, in the first embodiment, when the sign of the drive torque is reversed from positive to negative and both the left and right front and rear wheel speeds have converged, the method for selecting the wheel speed used for estimating the vehicle body speed is switched from select-low to select-high. FIG. 4 is a time chart illustrating an action for switching the wheel speed selection method of the first embodiment, and FIG. 5 is an enlarged view of the main part of FIG. 4. The sign of the drive torque (motor torque) is reversed from positive to negative and TCS is switched to ASC at time t1, but since the left and right front and rear wheel speeds have not both converged, wheel speed selection by means of select-low is continued. The estimated vehicle body speed is the average value each of the wheel speeds of the rear wheels 1RL, 1RR, which is not influenced by the overshoot of the front wheels 1FL, 1FR, compared to a case of switching to a wheel speed selection by means of select-high, an estimated vehicle body speed that is closer to the actual vehicle speed is obtained, so that it is possible to suppress a G drop and a decrease in the estimation accuracy of the vehicle body speed.

At time t2, although the front and rear wheel speeds on the right side have converged, the front and rear wheel speeds on the left side have not converged, so that wheel speed selection by means of select-low is continued.

At time t3, both the left and right front and rear wheel speeds have converged, so that wheel speed selection by means of select-low is switched to wheel speed selection by means of select-high. The estimated vehicle body speed becomes the average value of each of the wheel speeds of the front wheels 1FL, 1FR. The average value of each of the wheel speeds of the front wheels 1FL, 1FR after the elimination of the overshoot during deceleration of the vehicle is a value that is closer to the actual vehicle speed than the average value of each of the wheel speeds of the rear wheels 1RL, 1RR. Thus, after the overshoot is eliminated, it is possible to suppress a decrease in the estimation accuracy of the vehicle body speed by switching to the wheel speed selection by means of select-high.

As described above, the effects listed below are exhibited with the first embodiment.

(1) When the sign of the drive torque that is applied to the wheels 1 is reversed and the absolute value difference of at least two of the wheel speeds becomes smaller than the threshold value ε, the ECU 3 switches the method for selecting the wheel speed used for estimating the vehicle body speed between select-low and select-high. When a certain wheel speed overshoots, the absolute value difference between said wheel speed and the other wheel speeds increases, and the absolute value difference decreases as the overshoot settles. That is, the convergence status of the two wheel speeds can be determined by examining the absolute value difference between the two wheel speeds. Then, by switching the wheel speed selection method when the absolute value difference becomes smaller than the threshold value ε, it is possible to obtain an estimated vehicle body speed that has suppressed the influence of the overshoot of the wheel speeds, and to suppress a decrease in the estimation accuracy of the vehicle body speed.

(2) When the sign of the drive torque is reversed and the absolute value difference between the front right wheel speed and the rear right wheel speed is smaller than the threshold value ε and the absolute value difference between the front left wheel speed and the rear left wheel speed is smaller than the threshold value ε, the ECU 3 switches the wheel speed selection method. Since a constant speed difference is generated between the left and right wheel speeds while the vehicle is turning, it is difficult to accurately determine the convergence status of the wheel speed, even if the left and right wheel speeds are compared. On the other hand, the speed difference between the front and rear wheel speeds on the left side and the right side is smaller than the speed difference between the left and right wheel speeds, even when the vehicle is turning. For this reason, by comparing the front and rear wheel speeds for each of the left and right sides, it is possible to accurately determine the convergence status of the wheel speeds. As a result, it is possible to switch the method for selecting the wheel speed at a more appropriate timing.

(3) Select-low is a method for comparing two values based on the wheel speeds and selecting the lower of the two, and select-high is a method for comparing two values based on the wheel speeds and selecting the higher of the two. The effect of the overshoot of the wheel speed on the estimated vehicle body speed occurs when switching the wheel speed selection method between select-high and select-low. By employing the wheel speed selection method of the first embodiment, it is possible to suppress the decrease in the estimation accuracy of the vehicle body speed that accompanies the switching between select-high and select-low.

(4) Select-low is a wheel speed selection method used for estimating the vehicle body speed in the TCS, which suppresses the driving slip of the wheels 1 when the sign of the drive torque is positive, and select-high is a wheel speed selection method used for estimating the vehicle body speed in the ASC, which suppresses the braking slip of the wheels 1 when the sign of the drive torque is negative. At the time of acceleration and starting when driving slip occurs, with respect to the wheel speeds, the wheel speed that is relatively low is close to the actual vehicle speed, and at the time of deceleration when braking slip occurs, the wheel speed that is relatively high is close to the actual vehicle speed. Thus, by estimating the vehicle body speed by means of select-low in the TCS and estimating the vehicle body speed by means of select-high in the ASC, an estimated vehicle body speed that is closer to the actual vehicle speed is obtained, and it is possible to improve the control accuracy of the TCS and the ASC.

(5) After the sign of the drive torque is reversed and until the absolute value difference between at least two of the wheel speeds becomes smaller than the threshold value ε, the ECU 3 offsets and corrects the vehicle body speed estimated by means of select-low in the increasing direction, while offsetting and correcting the vehicle body speed estimated by means of select-high in the decreasing direction. A vehicle body speed estimated by means of select-low during deceleration shows a value lower than the actual vehicle speed, and a vehicle body speed estimated by means of select-high during acceleration shows a value higher than the actual vehicle speed. Thus, by offsetting and correcting the estimated vehicle body speed in the increasing direction in the case of select-low and in the decreasing direction in the case of select-high, it is possible to suppress a deviation of the estimated vehicle body speed with respect to the actual vehicle speed until the wheel speed selection method is switched, and to improve the estimation accuracy of the vehicle body speed.

(6) When the sign of the drive torque is reversed and positive, the ECU 3 applies creep torque to the wheels 1; and when the sign of the drive torque is reversed and negative, coasting torque is applied to the wheels 1. As a result, when switching between TCS and ASC, torque is applied in the direction in which the overshoot of the wheel speed is eliminated, so that the overshoot can be reduced at an early stage.

(7) The ECU 3 weights the amount of creep torque and coasting torque to be applied in accordance with the lateral G of the vehicle between the left-side wheels and the right-side wheels of the vehicle. When the vehicle is turning, there is a difference in speed between the left and right wheels, and the wheel speed of the inner wheels of the turn is lower than the wheel speed of the outer wheels of the turn. Therefore, the creep torque applied to the inner wheels of the turn is made larger than the creep torque applied to the outer wheels of the turn as the lateral G increases during acceleration of the vehicle, while the coasting torque applied to the outer wheels of the turn is made larger than the coasting torque applied to the inner wheels of the turn as the lateral G increases during deceleration of the vehicle, thereby making it possible to reduce the overshoot of the wheel speed at an early stage, even when the vehicle is turning.

(8) If a prescribed period of time (target time) has elapsed since the reversal of the sign of the drive torque, the ECU 3 switches the wheel speed selection method regardless of the absolute value difference between the front right wheel speed and the rear right wheel speed, and the absolute value difference between the front left wheel speed and the rear left wheel speed. Depending on the road surface condition, and the like, there are rare cases in which the front and rear wheel speeds do not converge; in that case, by forcibly switching the wheel speed selection method, it is possible to avoid continuation of the estimation of the vehicle body speed by means of select-low, even though TCS is switched to ASC. The same effect can be achieved when switching from ASC to TCS.

(9) The wheel speed sensors 4 that are provided on the wheels 1 of a four-wheel drive vehicle and that detect the wheel speeds, and the ECU 3 that estimates the vehicle body speed from each of the wheel speeds are provided, wherein, when the sign of the drive torque that is applied to the wheels 1 is reversed and the absolute value difference of at least two of the wheel speeds becomes smaller than the threshold value ε, the ECU 3 switches the method for selecting the wheel speed used for estimating the vehicle body speed between select-low and select-high. As a result, it is possible to obtain an estimated vehicle body speed that has suppressed the influence of the overshoot of the wheel speeds, and to suppress a decrease in the estimation accuracy of the vehicle body speed.

Second Embodiment

The basic configuration of the second embodiment is the same as that of the first embodiment; thus, only the portions different from those of the first embodiment will be described. In the block diagram of the control for switching the wheel speed selection method shown in FIG. 2, the right/left wheel convergence determination units 15 output 1 when the absolute value difference between the two wheel speeds excluding the highest value and the lowest value of the wheel speeds (corrected front right wheel speed, corrected front left wheel speed, corrected rear right wheel speed, corrected rear left wheel speed) is smaller than the threshold value ε, and output 0 when the absolute value difference is greater than or equal to the threshold value ε.

The following effects are exhibited according to the second embodiment.

(10) When the sign of the drive torque is reversed and the absolute value difference of the two wheel speeds excluding the highest value and the lowest value of the wheel speeds becomes smaller than the threshold value ε, the method for selecting the wheel speed is switched. By excluding the highest value and the lowest value from the wheel speeds to be compared, it is possible to decrease the threshold value ε for determining convergence of the wheel speeds, and to switch the method for selecting the wheel speed at a more appropriate timing.

Third Embodiment

The basic configuration of the third embodiment is the same as that of the first embodiment; thus, only the portions different from those of the first embodiment will be described. In the block diagram of the control for switching the wheel speed selection method shown in FIG. 2, the right-side wheel convergence determination unit 15a outputs 1 when the absolute value difference (absolute value of the difference) between the rate of change of the corrected front right wheel speed and the rate of change of the corrected rear right wheel speed is smaller than a threshold value δ (when the deviation of the rate of change of the wheel speed becomes within a second prescribed range), and outputs 0 when the absolute value difference is greater than or equal to the threshold value δ. The threshold value δ is set to a value with which it is possible to determine that the corrected front right wheel speed and the corrected rear right wheel speed are converging. The left-side wheel convergence determination unit 15b outputs 1 when the absolute value difference between the rate of change of the corrected front left wheel speed and the rate of change of the corrected rear left wheel speed is smaller than the threshold value δ (when the deviation of the rate of change of the wheel speed becomes within the second prescribed range), and outputs 0 when the absolute value difference is greater than or equal to the threshold value δ.

The following effects are exhibited according to the third embodiment.

(11) When the sign of the drive torque is reversed and the absolute value difference of the rate of change of least two of the wheel speeds becomes smaller than the threshold value δ, the method for estimating the wheel speed is switched. When a certain wheel speed overshoots, the absolute value difference between the rate of change of said wheel speed and the rates of change of the other wheel speeds increases, and the absolute value difference decreases as the overshoot settles. That is, the convergence status of the two wheel speeds can be determined by examining the absolute value difference between the rates of change of the two wheel speeds. Then, by switching the wheel speed selection method when the absolute value difference becomes smaller than the threshold value δ, it is possible to obtain an estimated vehicle body speed that has suppressed the influence of the overshoot of the wheel speeds and to suppress a decrease in the estimation accuracy of the vehicle body speed.

Other Embodiments

Implementation forms of the present invention were described above based on the foregoing embodiments, but specific configurations of the present invention are not limited by these embodiments, and modifications that can be made without departing from the scope of the invention are also included in the present invention. For example, in the embodiments, an example was presented in which the average value of the front wheel speeds is compared with the average value of the rear wheel speeds and the estimated vehicle body speed is determined by means of select-low or select-high, but one of the two lowest or two highest of the four wheel speeds (the lower or higher of the two wheel speeds for each of the front and rear axles can be selected, and the front and rear can be compared to select the lower or higher of the two), and values obtained by weighting the two wheel speeds (the values calculated by weighting the two wheel speeds for each of the front and rear axles can be compared), and the lower or higher of the two can be used as the estimated vehicle body speed.

The invention claimed is:

1. A vehicle control method for controlling a four-wheel drive vehicle based on an estimated vehicle body speed, the estimated vehicle body speed being determined from a wheel speed of each wheel of the four-wheel drive vehicle, the vehicle control method comprising:

determining whether a deviation of at least two of the wheel speeds among the wheel speeds is within a first prescribed range;

switching a method for selecting the wheel speed used for determining the estimated vehicle body speed between a first method and a second method when a sign of a drive torque that is applied to each of the wheels is reversed and the deviation of the at least two of the wheel speeds among the wheel speeds is within the first prescribed range; and controlling a torque of an electric motor of the four-wheel drive vehicle based on the estimated vehicle body speed.

2. The vehicle control method according to claim 1, wherein
the method for selecting the wheel speed used for determining the estimated vehicle body speed is switched when the sign of the drive torque is reversed and both a deviation of vehicle left-side front and rear wheel speeds and a deviation of vehicle right-side front and rear wheel speeds fall within the first prescribed range.

3. The vehicle control method according to claim 1, wherein
the method for selecting the wheel speed used for determining the estimated vehicle body speed is switched when the sign of the drive torque is reversed and the deviation of two of the wheel speeds excluding a highest value and a lowest value of the wheel speeds falls within the first prescribed range.

4. The vehicle control method according to claim 1, wherein
the first method is a method for comparing two values based on the wheel speeds and selecting a lower of the two values, and
the second method is a method for comparing two values based on the wheel speeds and selecting a higher of the two values.

5. The vehicle control method according to claim 4, wherein
the first method is a method used for determining the estimated vehicle body speed at a time of traction control, which suppresses driving slip of the wheels when the sign of the drive torque is positive, and
the second method is a method used for determining the estimated vehicle body speed at a time of anti-skid braking control, which suppresses a braking slip of the wheels when the sign of the drive torque is negative.

6. The vehicle control method according to claim 4, wherein
after the sign of the drive torque is reversed and until the deviation of the at least two of the wheel speeds falls within the first prescribed range, the estimated vehicle body speed determined by the first method is offset and corrected in an increasing direction, while the estimated vehicle body speed determined by the second method is offset and corrected in a decreasing direction.

7. The vehicle control method according to claim 1, further comprising
applying a creep torque to the wheels when the sign of the drive torque is reversed and positive, and applying a coasting torque to the wheels when the sign of the drive torque is reversed and negative.

8. The vehicle control method according to claim 7, wherein
the creep torque and the coasting torque Do bell are applied in amounts that are weighted in accordance with a lateral acceleration of the vehicle between left-side wheels and right-side wheels of the four-wheel drive vehicle.

9. The vehicle control method according to claim 1, wherein
the method for selecting the wheel speed used for determining the estimated vehicle body speed is switched regardless of the deviation upon a prescribed period of time elapsing since a reversal of the sign of the drive torque.

10. The vehicle control method according to claim 1, wherein
the method for selecting the wheel speed used for determining the estimated vehicle body speed is switched when the sign of the drive torque is reversed and a deviation of a rate of change of at least two of the wheel speeds falls within a second prescribed range.

11. A vehicle control device for controlling a four-wheel drive vehicle based on an estimated vehicle body speed, the vehicle control device comprising:
a plurality of wheel speed sensors where one of the wheel speed sensors is provided to each wheel of the four-wheel drive vehicle to detect a wheel speed for each of the wheels of the four-wheel drive vehicle; and
a controller configured to control the four-wheel drive vehicle based on an estimated vehicle body speed, the estimated vehicle body speed being determined from each of the wheel speeds,
the controller being configured to:
determine whether a deviation of at least two of the wheel speeds among the wheel speeds is within a first prescribed range,
switch a method for selecting the wheel speed used for determining the estimated vehicle body speed between a first method and a second method when a sign of a drive torque that is applied to each of the wheels is reversed and the deviation of the at least two of the wheel speeds among the wheel speeds is within the first prescribed range, and
control a torque of an electric motor of the four-wheel drive vehicle based on the estimated vehicle body speed.

* * * * *